US007076325B1

(12) United States Patent
Rapaich et al.

(10) Patent No.: US 7,076,325 B1
(45) Date of Patent: *Jul. 11, 2006

(54) MODULAR COMPUTER

(75) Inventors: Mark Rapaich, Westfield, IA (US); Elisa E Zappacosta, Sioux City, IA (US)

(73) Assignee: Gateway Inc., Irvine, CA (US)

( * ) Notice: Subject to any disclaimer, the term of this patent is extended or adjusted under 35 U.S.C. 154(b) by 429 days.

This patent is subject to a terminal disclaimer.

(21) Appl. No.: 09/886,481

(22) Filed: Jun. 21, 2001

Related U.S. Application Data

(63) Continuation of application No. 09/410,938, filed on Oct. 4, 1999, now Pat. No. 6,366,454.

(51) Int. Cl.
*G06F 1/16* (2006.01)
(52) U.S. Cl. .................. 700/213; 361/683; 312/216
(58) Field of Classification Search ........ 361/681–686, 361/740, 724–727; 312/223.1, 216–218; 700/95, 117, 213
See application file for complete search history.

(56) References Cited

U.S. PATENT DOCUMENTS

| 4,680,674 A | 7/1987 | Moore ................ 361/395 |
| 5,097,388 A | 3/1992 | Buist et al. ............ 361/393 |
| 6,366,454 B1* | 4/2002 | Rapaich et al. ........ 361/683 |
| 2002/0116087 A1* | 8/2002 | Brown .................. 700/213 |
| 2003/0004594 A1* | 1/2003 | Liu et al. .............. 700/95 |

* cited by examiner

*Primary Examiner*—Hung Van Duong
(74) *Attorney, Agent, or Firm*—Jeffrey A. Proehl; Leonard & Proehl Prof LLC

(57) ABSTRACT

A modular information handling system includes an upper chassis having a display and a power supply, and a lower chassis having a motherboard, memory, a processor, and a number of drive bays. The upper and lower chassis are interdependent, neither capable of functioning without the other. The upper and lower chassis are separately manufacturable, separately serviceable, and separately shippable.

20 Claims, 4 Drawing Sheets

MODULAR COMPUTER

RELATED APPLICATION

This application is a continuation and is a non-provisional application claiming benefit under 35 U.S.C. § 120 of non-provisional U.S. application Ser. No. 09/410,938, filed Oct. 4, 1999 now U.S. Pat. No. 6,366,454.

FIELD

The present invention relates generally to personal computers, and more specifically to multi-piece personal computers.

BACKGROUND

As more and more homes become equipped with personal computers, and as more and more computer peripheral devices and uses for computers arise, personal computers have become unwieldy and increasingly more complex to assemble. For example, a typical desktop computer system has a central processing unit (CPU) which houses a motherboard, memory, storage such as a hard drive or drives, a floppy drive, a power supply, add-on peripherals such as a modem, CD-ROM drive, DVD-ROM drive, tape backup, and the like. Such peripherals are often internal to the housing, but may also be connected externally. Other usually external peripherals include a pointing device such as a mouse, a keyboard, speakers, printers, microphones, and the like. Each of the components must be connected to the CPU, most often with cables or the like. In some instances, for example the Destination computer system manufactured by Gateway, Inc., some peripheral components are connected to the CPU via a wireless link.

In addition to all the peripherals connected to a CPU, a display device such as a monitor is also connected to the computer. Monitors typically have their own power supply connected to their own source of power using a power cord. Such power is usually supplied by connection to a standard wall outlet. The CPU power supply is also connected to a standard wall outlet to supply its power supply with electricity.

Cabling must also typically be connected between the CPU and the monitor to transfer signals back and forth between the monitor and the CPU. Such connections require the user to determine which cable attaches to which port, and require time and effort if the computer is to be moved from its location to another location. Further, cables such as power cords are potentially subject to abuse including bending, compression, fraying, gnawing by pets or rodents, and the like.

There is therefore a need in the art for a monitor easily connectable to a CPU without the need for cabling.

There is also a need in the art for a computer that is easily and quickly upgradeable with low amounts of down time.

SUMMARY

The present invention overcomes the problems of the art by providing in one embodiment an information handling system having two modules, an upper module and a lower module, which are interdependent. The upper and lower modules each contain components necessary for the operation of the assembled computer system. Without each other, the modules do not have independent functionality.

In one embodiment, a computer includes a lower chassis having a motherboard, drive bays, and a lower chassis blind mate connector for connecting the lower chassis to an upper chassis, and an upper chassis having a power supply, a monitor, and an upper chassis blind mate connector, the lower and upper chassis connectable by the blind mate connectors to pass signals and power therebetween.

In another embodiment, the lower chassis has a number of guide pins which when the lower and upper chassis are assembled together engage a mating number of guide pin openings to align the upper and lower chassis. In this alignment, the blind mate connectors of the upper and lower chassis also engage one another without the need for cabling, providing an operable system.

Other embodiments are described and claimed.

DESCRIPTION OF EMBODIMENTS

In the following detailed description of embodiments, reference is made to the accompanying drawings which form a part hereof, and in which are shown by way of illustration specific embodiments in which the invention may be practiced. These embodiments are described in sufficient detail to enable those skilled in the art to practice the invention, and it is to be understood that other embodiments may be utilized and logical, structural, electrical, and other changes may be made without departing from the scope of the present invention.

Figure 1:
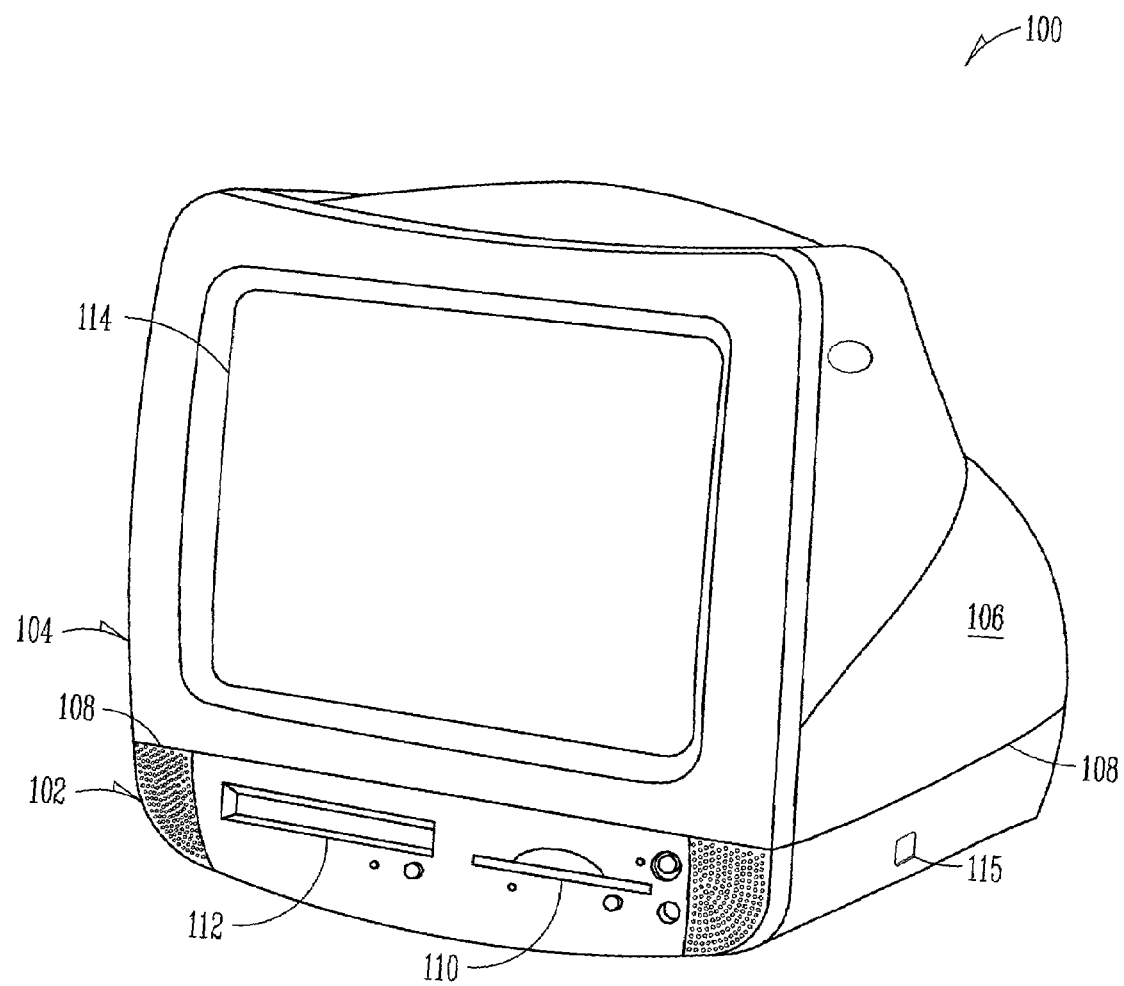
FIG. 1 is a perspective view of one embodiment of the present invention.

FIG. 1 shows a perspective view of a computer 100 according to one embodiment of the present invention. Computer 100 is a modular computer having a lower chassis 102 and an upper chassis 104. Lower chassis 102 and upper chassis 104 fit together to form a substantially smooth outer surface 106 at the connection point 108. In other words, the lower chassis 102 and the upper chassis 104 are substantially flush to one another when the computer 100 is assembled.

In one embodiment, lower chassis 102 comprises a housing containing a motherboard 103 having a processor, memory, expansion slots such as PCI and ISA expansion slots, and associated circuitry and modules such as a modem, sound card, video card, and the like. Further, the lower chassis 102 contains bays for drives such as a floppy drive 110, a CD-ROM or DVD-ROM drive 112, a tape backup unit, and the like. Also, bays for internal drives such as a hard drive are contained in lower chassis 102. Lower chassis 102 further includes a connector port for connection to an external supply of power, as in this embodiment, lower chassis does not contain a power source. In one embodiment, the lower chassis also has connection ports for external peripheral devices. Such connection ports are in one embodiment universal serial bus (USB) ports 115.

In this embodiment, upper chassis 104 contains a display 114 and a power supply. The power supply is connectable to a source of power such as standard electrical current from a house electrical outlet. AC power is received into the upper chassis. The AC line in is split. AC power goes to the display to power the display, and to the power supply. The power supply converts AC power to DC power for use by the remaining components of the computer 100. The upper chassis further includes a connector port for connection to an external motherboard or CPU. The connector port is operatively connected to the power supply to provide only DC power to the connector port for connection to another connection port for the lower chassis.

In this embodiment, the connector ports of the lower and upper chassis are operatively connectable to each other, the lower chassis receiving solely DC power through the upper chassis connector port to its motherboard to provide operating power for the processor, memory, associated circuitry and modules, internal drives, and the like. The upper and lower chassis also transfer operating signals back and forth between the upper and lower chassis via the connection of their respective connector ports.

The upper and lower chassis are connected together operatively by the connector ports. In one embodiment, the connector ports are blind mate connector ports. When the upper and lower chassis are assembled together, the blind mate connectors of the upper and lower chassis mate with one another to connect the upper and lower chassis together operatively. No cabling or cords are necessary in this embodiment to connect the upper and lower chassis together, yet a full size cathode ray tube (CRT) may be used to provide the display.

In this embodiment, neither of the modules, upper or lower, will function without the other. The two modules are interdependent.

Figure 2:
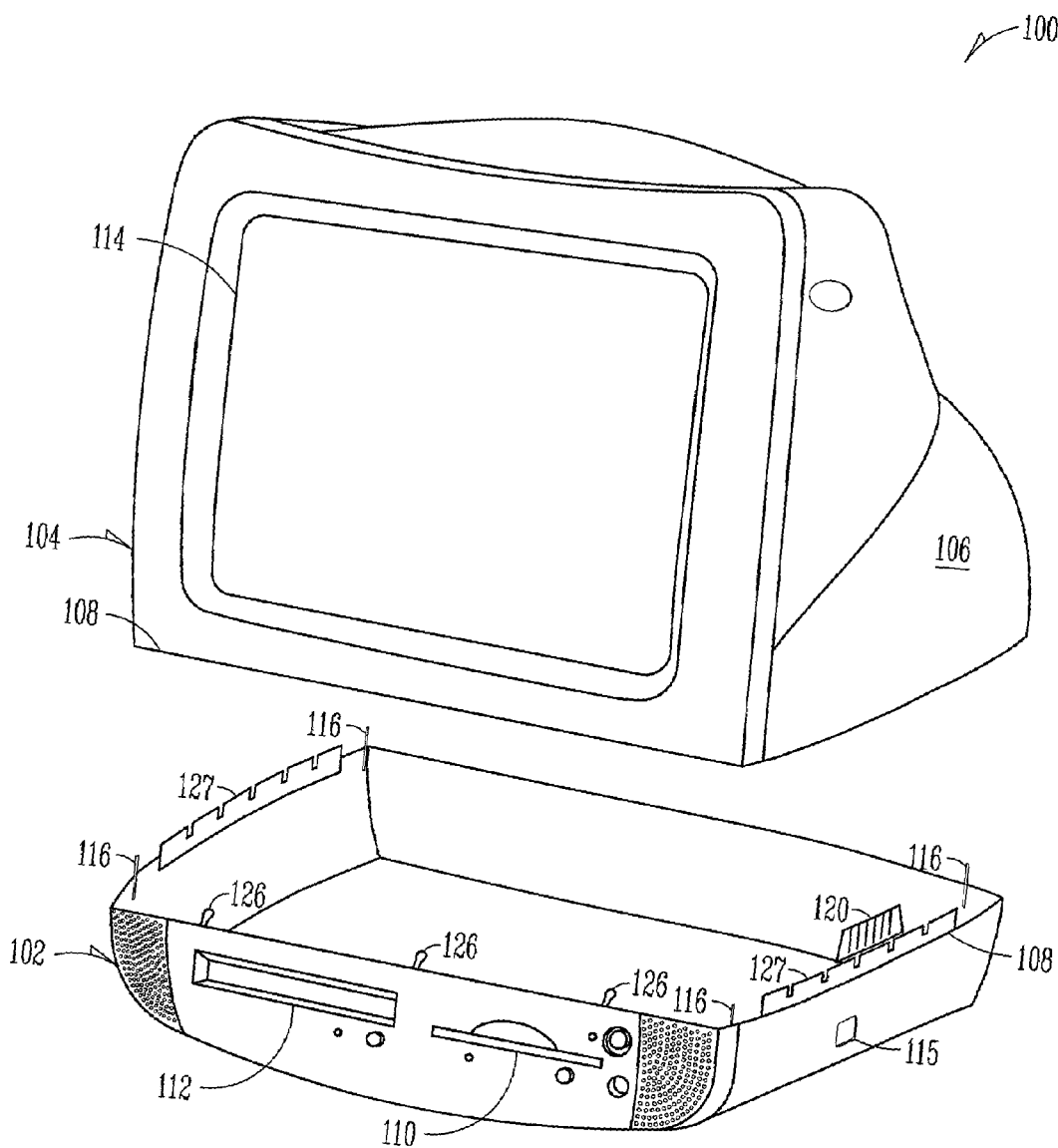
FIG. 2 is an exploded perspective view of the embodiment of FIG. 1.

FIG. 2 shows a front elevation view of the computer 100 in an exploded fashion, with lower chassis 102 and upper chassis 104 separated. The upper and lower chassis connect physically together in one embodiment using a plurality of guide pins and guide pin openings. Guide pins 116 on the lower chassis engage guide pin openings 118 on the upper chassis when the upper and lower chassis are assembled together. To further assist in the alignment of the upper chassis 104 and the lower chassis 102, in one embodiment, tabs 126 on lower chassis 102 engage slots or tab openings 128 on upper chassis 104. The tabs 126 and tab openings 128 are best seen in FIGS. 3 and 4.

Further alignment is provided in one embodiment by mating tabs 127 and 129 on the lower chassis 102 and upper chassis 104 respectively, as is best shown in FIGS. 2, 3, 4, and 5. Tabs 127 engage tabs 129 to assist in alignment of the upper and lower chassis. It should be understood that the location of the tabs can be adjusted, and the tabs switched between the upper and lower chassis, without deoarting from the scope of the invention.

Figure 5:
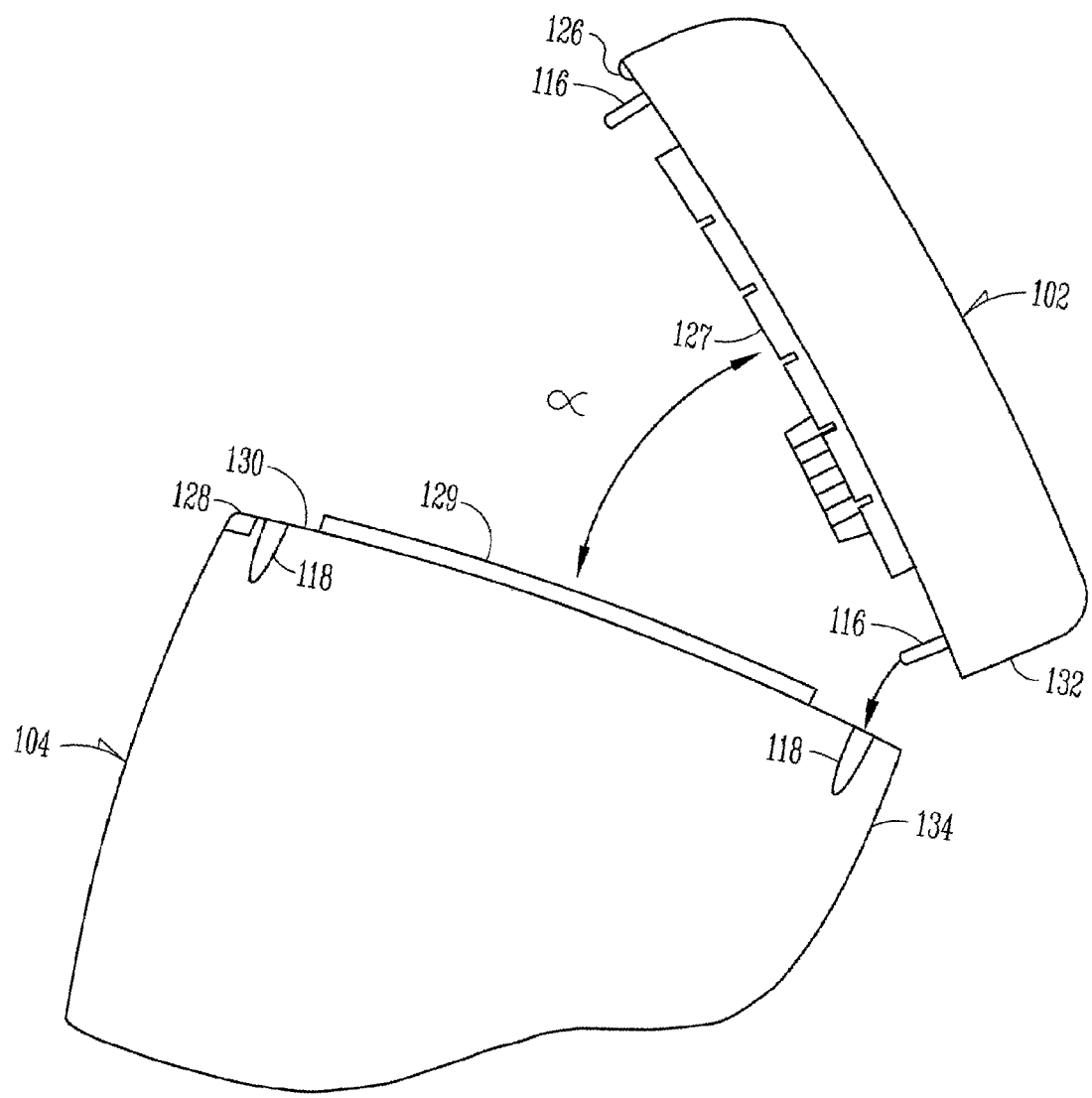
FIG. 5 is a view showing the assembly of an embodiment of the present invention.

Assembly of the modular components 102 and 104 of computer 100 is shown in FIG. 5. The upper chassis module 104 is inverted so that its bottom surface 130 is facing substantially upward. Lower chassis module 102 is also inverted. Two guide pins 116 along one edge 132 of the lower chassis 102 are aligned with mating guide pin openings 118 also along one edge 134 of the upper chassis with the lower chassis being positioned at an angle alpha with respect to the surface 130 of the upper chassis. When the guide pins 116 along edge 132 meet with and engage the guide pin openings 118 along edge 134 of the upper chassis 104, the remaining connections of the upper and lower chassis, that is the blind mate connectors and the remaining guide pins and guide pin openings, are readily made. In one embodiment, fasteners such as quick release fasteners, thumb screw fasteners, screws or the like are used to fully secure the upper and lower chassis together.

Figure 3:
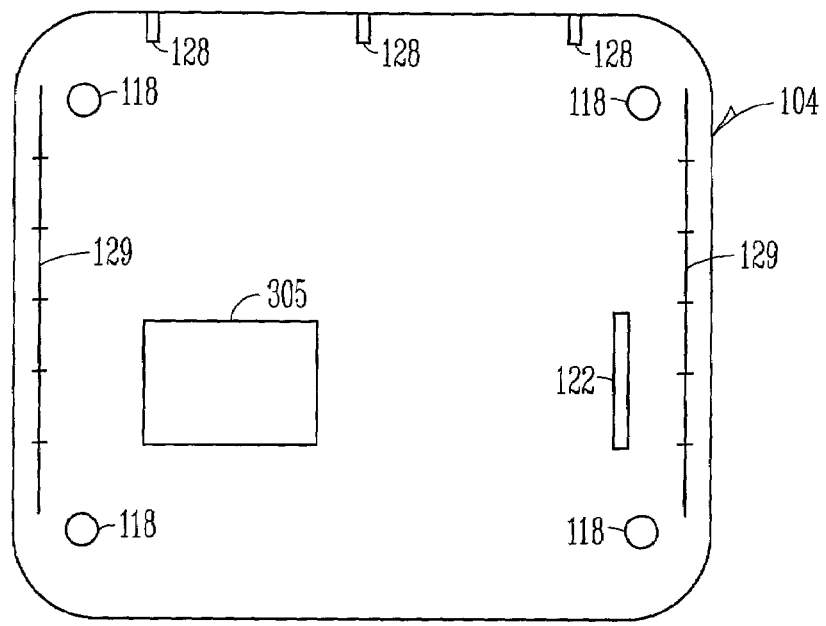
FIG. 3 is a bottom view of an upper chassis embodiment of the present invention.
Figure 4:
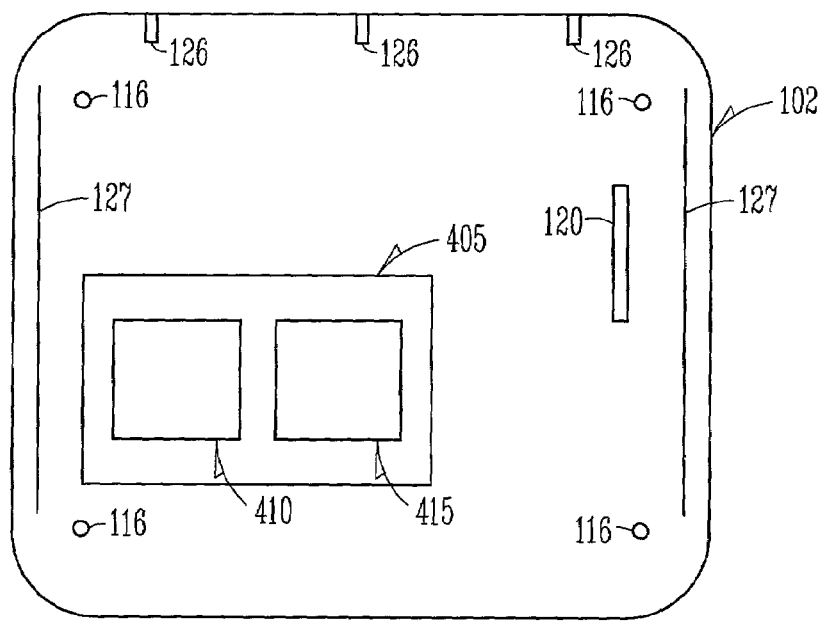
FIG. 4 is a top view of a lower chassis embodiment of the present invention.

In the rotation of the lower chassis to engage fully the guide pins 116 of lower chassis 102 with the guide pin openings 118 of upper chassis 104, the blind mate connector 120 of lower chassis 102 operatively couples with a blind mate connector 122 of upper chassis 104 (as seen in FIG. 3), operatively coupling the upper and lower chassis for transmission of power and computer signals between the upper and lower chassis. Power supply 124 in upper chassis 104 is responsible in this embodiment for receiving AC power from a standard source such as a wall outlet, supplying appropriate AC power to the display 124, converting AC power into appropriate DC power and supplying that DC power to the blind mate connector 122 (as seen in FIG. 3) so as to provide DC power to the motherboard 103 and its connected peripherals and drives.

The embodiments of the present invention have a number of advantages over other known computer configurations. For example, no cabling or wiring is required to connect the upper chassis 104 to the lower chassis 102 to provide a connection of the power supply to the motherboard, and to supply the necessary signals to the display to allow it to properly display information.

Additionally, the modular nature of the upper and lower chassis configuration allows for ease of servicing, replacement, repair, and upgrade of the computer. For example, an entire motherboard complete with new processor, video card, modem, drives, and the like can be swapped by replacing the lower chassis. In this embodiment, a user's drives containing information can easily be removed from one lower chassis and inserted into another lower chassis. The defective or replaced lower chassis may then be serviced or salvaged at a later time. The down time of a user's computer can be reduced by swapping in a new or replacement lower chassis. Similarly, the lower chassis may be sent for servicing without the need for sending or shipping a display, which can subject the display to unnecessary jarring or damage. Further, the computer embodiments described herein reduce the weight and dimensions of the system, reducing the shipping costs for both shipping new systems, and for returns for servicing such as repair or upgrade. Most of the components that need servicing are contained within the lower chassis, which is smaller and lighter than traditional CPUs.

Advantages of the modular computer design embodiments described above are also evident in manufacturing. The modules can be manufactured separately from one another, and can therefore be assembled and shipped from different locations.

Further advantages of the modular computer system embodiments of above become evident when international shipping of the computer is to be made. Many countries place high tariffs on computer systems when they are imported into the country. Typically, a computer system is defined as including a processor, a power supply, memory, and a motherboard. In other words, a computer is defined as a fully operation system, without a requirement that the system have a monitor. The embodiments of the present invention are not functional systems without one another. Neither the lower chassis nor the upper chassis is operational without the other component. Both components must be present in order for the system to operate. Therefore, neither of the modules is a computer as that term is defined by most countries, shipping them internationally.

Another advantage of the modular computer embodiments described above is that since the DC power to operate the lower chassis is supplied through the blind mate connection to the upper chassis, servicing the lower chassis will necessarily involve removing the power connection to the lower chassis. Therefore, the chances of shock or injury due to power in the lower chassis will be reduced.

The lower chassis in one embodiment is limited to the use of DC power to power its components. Becuase only DC power is used in this embodiment, the Underwriters Laboratory (UL) specifications for electronic components using AC power, which are more stringent than those for DC power, need not be met. This increases the availability of materials and structures that can be utilized for the lower chassis.

Air passages for cooling are disposed about the upper and lower chassis. Further, forced air cooling is also used to cool the upper chassis. In one embodiment, low heat components are used in the lower chassis. Cooling of the lower chassis is then accomplished without a fan by convection. Heat from the display vents upward, causing convetive currents to cool the lower chassis as warm air rises.

Because of the modularity of the components of the embodiments of the information handling system, numerous business advantages are obtained. Included by way of example only and not by way of limitation, business advantages to the modular information handling system embodiments of the present invention are in the manufacturing areas, shipping areas, and service areas.

In the manufacturing area, the modules or chassis are in one embodiment manufactured at different locations, and need not be pre-assembled for testing. Instead, shipping is accomplished directly from the manufacturing location to the user. This reduces overall shipping costs, csince components are often manufactured at different locations, and are currently all congregated for testing at one location before shipping.

In the shipping areas, import and export tariffs are reduced by the interdependent functions of the modules in that neither module will typically be classified as a computer. Instead, the classification will be as components not subject to computer system tariffs.

In the service area, both upgrade and repair are improved with the embodiments of the present invention. Upgrading is accomplished in one embodiment by having the manufacturer ship an entire lower chassis to the user for replacement of the original lower chassis. in this embodiment, the motherboard, memory, and the like can all be upgraded. The user simply removes the mass storage from the original component and installs it in the new component. Very little down time occurs. The user then ships the original component back to the manufacturer for salvage or the like.

Repair is also more easily effected eith the embodiments of the present invention. Most of the components or parts to be repaired in a typical computer system are situated in the embodiments of the present invention in the lower chassis. The reduced size and weight of the lower chassis makes it easier and less expensive to ship to the manufacturer for repairs. This reduces costs and inconvenience for the user.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the following claims, and the full scope of equivalents thereof.

What is claimed is:

1. A method of manufacturing an information handling system, comprising:

manufacturing a lower chassis having a housing, a motherboard, memory, a plurality of expansion drive bays, and a connector for connection to an external supply of DC power, wherein the motherboard, the memory, and the plurality of expansion drive bays are connected to the housing of the lower chassis;

manufacturing an upper chassis having a housing, a display, and a power supply, wherein the upper chassis is manufactured at a different location than the lower chassis, and wherein the display and the power supply are connected to the housing of the upper chassis, wherein the upper chassis is manufactured to be disposed on top of the lower chassis, and wherein the lower chassis is manufactured to be disposed beneath the upper chassis; and shipping the lower and the upper chassis directly to a customer without pre-assembly of the upper and lower chassis, wherein the shipping of either the upper or the lower chassis avoids import and export tariffs associated with shipping the entire information handling system.

2. The method of claim 1, wherein the lower chassis further has a lower chassis blind mate connector.

3. The method of claim 1, wherein the lower chassis has a plurality of guide pins extending therefrom, and wherein the upper chassis has a plurality of mating guide pin openings for connecting the upper and lower chassis.

4. The method of claim 1, wherein manufacturing the lower chassis further comprises:

manufacturing the lower chassis to fit substantially flush with the upper chassis.

5. The method of claim 1, wherein manufacturing the upper chassis further comprises:

manufacturing the upper chassis to fit substantially flush with the lower chassis.

6. The method of claim 1, wherein the import and export tariffs are avoided by neither the upper chassis nor the lower chassis alone being classified as a computer.

7. The method of claim 1, wherein the upper chassis and lower chassis are connectable without cabling.

8. The method of claim 2, wherein the upper chassis further has an upper chassis blind mate connector.

9. The method of claim 8, wherein the lower and upper chassis are connectable by the upper and lower chassis blind mate connectors to pass signals therebetween.

10. The method of claim 8, wherein the upper chassis further comprises an AC to DC power converter, and the upper chassis blind mate connector is for passing only DC power to the lower chassis.

11. The method of claim 9, wherein the lower and upper chassis are only operational when connected via the upper and lower chassis blind mate connectors.

12. A method of manufacturing an information handling system, comprising:

manufacturing a lower chassis having a housing, a motherboard, memory, a plurality of expansion drive bays, and a connector for connection to an external supply of DC power, wherein the motherboard, the memory, and the plurality of expansion drive bays are connected to the housing of the lower chassis;

manufacturing an upper chassis having a housing, a display, and a power supply, wherein the upper chassis is manufactured at a different location than the lower chassis, and wherein the display and the power supply are connected to the housing of the upper chassis, wherein the upper chassis is manufactured to be disposed on top of the lower chassis, and wherein the lower chassis is manufactured to be disposed beneath the upper chassis; and shipping the lower and the upper chassis directly to a customer without pre-assembly of the upper and lower chassis, wherein shipping the lower and upper chassis directly from the manufacturing location reduces shipping costs when the lower and upper chassis are manufactured at different locations.

13. The method of claim 12, wherein the lower chassis further has a lower chassis blind mate connector.

14. The method of claim 12, wherein the lower chassis has a plurality of guide pins extending therefrom, and wherein the upper chassis has a plurality of mating guide pin openings for connecting the upper and lower chassis.

15. The method of claim 12, wherein manufacturing the lower chassis further comprises:

manufacturing the lower chassis to fit substantially flush with the upper chassis.

16. The method of claim 12, wherein manufacturing the upper chassis further comprising:

manufacturing the upper chassis to fit substantially flush with the lower chassis.

17. The method of claim 13, wherein the upper chassis further has an upper chassis blind mate connector.

18. The method of claim 17, wherein the lower and upper chassis are connectable by the upper and lower chassis blind mate connectors to pass signals therebetween.

19. The method of claim 17, wherein the upper chassis further comprises an AC to DC power converter, and the upper chassis blind mate connector is for passing only DC power to the lower chassis.

20. The method of claim 18, wherein the lower and upper chassis are only operational when connected via the upper and lower chassis blind mate connectors.

* * * * *